United States Patent
Castillo et al.

(10) Patent No.: US 7,548,316 B2
(45) Date of Patent: Jun. 16, 2009

(54) SYSTEM AND METHOD FOR LEAD EDGE AND TRAIL EDGE SHEET CONSTRAINT AND CURL SENSING

(75) Inventors: Ruddy Castillo, Bronx, NY (US); Barry Paul Mandel, Fairport, NY (US); Kenneth R. Ossman, Macedon, NY (US); Stanley J. Wallace, Victor, NY (US); Michael D. Borton, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 11/737,083

(22) Filed: Apr. 18, 2007

(65) Prior Publication Data
US 2008/0019751 A1 Jan. 24, 2008

Related U.S. Application Data

(63) Continuation-in-part of application No. 11/490,692, filed on Jul. 20, 2006.

(51) Int. Cl.
*G01N 21/25* (2006.01)

(52) U.S. Cl. ............ 356/406; 250/223 R; 250/221; 250/559.4

(58) Field of Classification Search .......... 356/406, 356/625; 250/223 R, 559.4
See application file for complete search history.

(56) References Cited

U.S. PATENT DOCUMENTS

| | | | |
|---|---|---|---|
| 4,077,519 A | 3/1978 | Huber | 209/74 R |
| 4,397,460 A * | 8/1983 | Milanes et al. | 271/263 |
| 4,588,292 A * | 5/1986 | Collins | 356/71 |
| 4,627,718 A | 12/1986 | Wyer | 355/35 H |
| 5,270,778 A | 12/1993 | Wyer | 355/311 |
| 5,751,443 A | 5/1998 | Borton et al. | 356/446 |
| 5,787,331 A * | 7/1998 | Ohkuma et al. | 399/406 |
| 6,015,146 A * | 1/2000 | Siegel | 271/98 |
| 6,242,733 B1 * | 6/2001 | Ma et al. | 250/223 R |
| 6,486,464 B1 * | 11/2002 | Ma et al. | 250/223 R |
| 6,668,155 B1 | 12/2003 | Hubble, III et al. | 399/406 |
| 6,794,633 B2 * | 9/2004 | Iwasaki | 250/221 |
| 2002/0074714 A1 * | 6/2002 | Yow et al. | 271/162 |

* cited by examiner

*Primary Examiner*—Tarifur R. Chowdhury
*Assistant Examiner*—Isiaka O Akanbi
(74) *Attorney, Agent, or Firm*—Kermit D. Lopez; Luis M. Ortiz; William B. Shelby

(57) ABSTRACT

A lead edge and/or trail edge sheet curl sensing and constraint method and system. First and second light emitters and detector pairs are aligned such that the light beams from the first light emitter and second light emitter cross at the transport media sheet substrate path, which constitutes the path of a media sheet substrate with zero curl. A media sheet substrate with either positive or negative curl on the lead edge of the sheet substrate interrupts light beams from the first and second light emitters, as detected by first and second light detectors. A similar approach can be used to detect the trail edge curl. The time delay between the light beam interruptions is proportional to the sheet substrate curl, and the order of interruptions indicates whether the sheet substrate curl is positive or negative. A first pair and a second pair of substrate constraint rollers can also be provided in the paper path upstream and downstream of the sensing system. The roller pairs closest to the sensor are made of relatively non-deformable materials or of materials of similar elasticity so that different media are constrained in the sensor zone with the same sheet trajectory relative to the nip.

18 Claims, 9 Drawing Sheets

SYSTEM AND METHOD FOR LEAD EDGE AND TRAIL EDGE SHEET CONSTRAINT AND CURL SENSING

CROSS-REFERENCE TO RELATED APPLICATION

This application is a continuation-in-part of U.S. patent application Ser. No. 11/490,692, entitled "Lead Edge Sheet Curl Sensor", which was filed with the U.S. Patent and Trademark Office on Jul. 20, 2006 the disclosure of which is incorporated herein by reference in its entirety.

TECHNICAL FIELD

Embodiments are generally related to electrophotographic and inkjet printing machines. Embodiments are also related to the field of sheet substrate curl detection sensors utilized in rending devices such as printers. Embodiments are also related to sheet constraint systems and methods.

BACKGROUND

The curling of print media sheets is a particular problem in the printing industry, and is exacerbated by high-density images and plural color printing. Sheet curling, however, can occur even in the context of unprinted sheets of paper due to changes in ambient humidity or moisture content of the paper. Sheet curling can interfere with proper sheet feeding, causing sheet feeding jams or delays. If sheet curl is present in the output, it can interfere with proper stacking or other finishing operations. For example, if printed sheets with curl do not lie flat when stacked together in sets, such as in the pages of booklets, an objectionable distortion of the resulting booklet may result.

Furthermore, the amount of moisture in the sheet of paper can drastically change from the printing process itself, to cause or exacerbate curl. In particular, from water-based ink jet printing or the thermal fusing operation for toners in xerographic printing, and particular from high density image printing near the edges of the sheet. There is a further sheet curl problem in duplex printing, where the sheets are re-fed or recirculated for printing imaging material on their second sides, especially if that involves a second pass of the sheet through a thermal fuser and/or higher density images on one side than the other.

In order to control or remove the amount of curl, the print media curl must be measured. Various paper curl sensors and control apparatus are known in the electrophotographic printing arts. One example is disclosed U.S. Pat. No. 6,668,155, entitled "Lead Edge Paper Curl Sensor," which issued to Hubble, III, et al. on Dec. 23, 2003 and is assigned to the Xerox Corporation of Stamford, Conn. U.S. Pat. No. 6,668,155, which is incorporated herein by reference in its entirety, discloses a sheet curl sensor that remotely senses sheet curl without contacting or interfering with the motion of the sheets in their normal sheet path. This sensor operates on a portion of the moving sheet at an angle thereto and perpendicular thereto, with displacement insensitive optics, in both an angular direction substantially parallel to the sheet movement direction and an angular direction substantially transverse to the sheet movement direction, with rationing of the two input signals. In such a sheet curl sensor, the variable output control signals in response to the sensed illumination are a ratio of the output control signals from the photodetector system produced by the first and second illuminators. The ratio of the output signals from the photodetector system is then proportional to the amount of the paper curl sensed.

Another example of a paper curl sensor is disclosed in U.S. Pat. No. 5,270,778, entitled "Sheet Curl Control Apparatus," which issued to Andrew Wyer on Dec. 14, 1993 and is assigned to the Xerox Corporation of Stamford, Conn. U.S. Pat. No. 5,270,778, which is incorporated herein by reference in its entirety, discloses a sheet curl sensor comprising a radiation source, in the form of an infra-red emitter and two detectors in the form of infra-red sensors. The sensors are spaced apart adjacent a horizontal section of sheet path and are arranged whereby movement of the sheet material along the sheet path causes the infra-red light beams to be interrupted in succession by the lead edge of the sheet material. The time interval between interruptions of the infra-red light beams at the sensors is a function of the sheet curl.

U.S. Pat. No. 5,751,443, entitled "Adaptive Sensor and Interface," which issued to Borton et al on May 12, 1998 and assigned to the Xerox Corporation is an example of a precise lead edge sensing system. U.S. Pat. No. 5,751,443, which is incorporated herein by reference in its entirety, discloses a sensor which detects the presence of paper and transparencies in a sheet transporting path and includes a light source disposed near the transporting path for projecting light toward a reflector on the opposite side of the transporting path and a light detector located relative to the light source to receive light emitted by the light source and reflected b the reflector so that by such positioning the light path is interrupted by substrates passing through the transport path. The output signal of the light detector is proportional to the light received across the transport path. A control, electrically connected to the sensor, adjusts flux incident on the light detector to maintain the collector current in the linear portion of the light detector's operating range. The sensor is tilted at an angle with respect to the horizontal of a copy substrate to be able to detect transparencies.

One problem encountered by prior art sheet curl sensors relates to the maximum resolution of the sensor. Expensive and complicated solutions have been used to measure to a resolution of less that 0.01 mm. The ability to properly measure and accurately control the lead edge sheet curl depends on the proper constraint of the leading edge of the sheet. A single elastomer roller is inadequate since the idler compresses the elastomer roller and the exit angle of the sheet therefore depends on the elastomer properties, the roller forces and the sheet media stiffness and weight. A constraint system is therefore required, which will not damage or mark the media sheets while ensuring that the sheets remain at a consistent height and angle.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification claims, drawings, and abstract as a whole.

It is, therefore, one aspect of the present invention to provide for a leading edge and trail edge sheet curl sensor with an improved constraint system.

It is another aspect of the present invention to provide for an improved lead edge sheet curl sensor apparatus and method.

It is another aspect of the present invention to provide for a lead edge sheet curl sensor that is robust to different paper weights and other properties.

The aforementioned aspects and other objectives and advantages can now be achieved as described herein. A lead edge sheet curl sensor and constraint method and system disclosed. In general, a first light emitter and a second light emitter can be aligned such that the fight beams from the first light emitter and second light emitter cross at the transport media sheet substrate path, which constitutes the path of a media sheet substrate with zero curl. First and second light detectors are also provided, which are aligned to receive the light beams from the first and second light emitters. A media sheet substrate with either positive or negative curl on the lead edge of the sheet substrate interrupts the light beams from first and second light emitters, as detected at first and second light detectors. Additionally, the time delay between the light beam interruptions is proportional to the sheet substrate curl and the order of interruptions indicates whether the sheet substrate curl is positive or negative. A first pair and a second pair of substrate constraint rollers are provided, such that each roller of the first and said second pair of substrate constraint rollers is disposed on opposite sides of the transport media substrate path.

The method and system disclosed herein therefore can constrain the lead edge (and optionally also the trail edge) of each sheet so that it can be accurately detected by a curl height sensing system. When constraining the lead edge of the sheet, the disclosed embodiments ensure that the sheet enters the sensing zone at the same height and angle. In addition, such a method and apparatus ensures that the lead edge of the sheet does not have cross-process buckling or corrugation that could prevent the lead edge from curling up or downward as required to accurately sense the process direction curl. This can be accomplished using a dual nip system, where the nips are spaced closely together. The nip closest to the sensor can be implemented as a "hard" or relatively non-deformable nip and this hard nip should be designed to span the full width of the sheet. Alternatively, the nip closest to the sensor can be implemented as a deformable nip with both the upper and lower rollers having approximately the same hardness, thus yielding a consistent sheet ejection angle with a wide range of media. A second set of similar "constraint" rolls can optionally be utilized to measure the tail edge curl with the same sensor.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Figure 1:
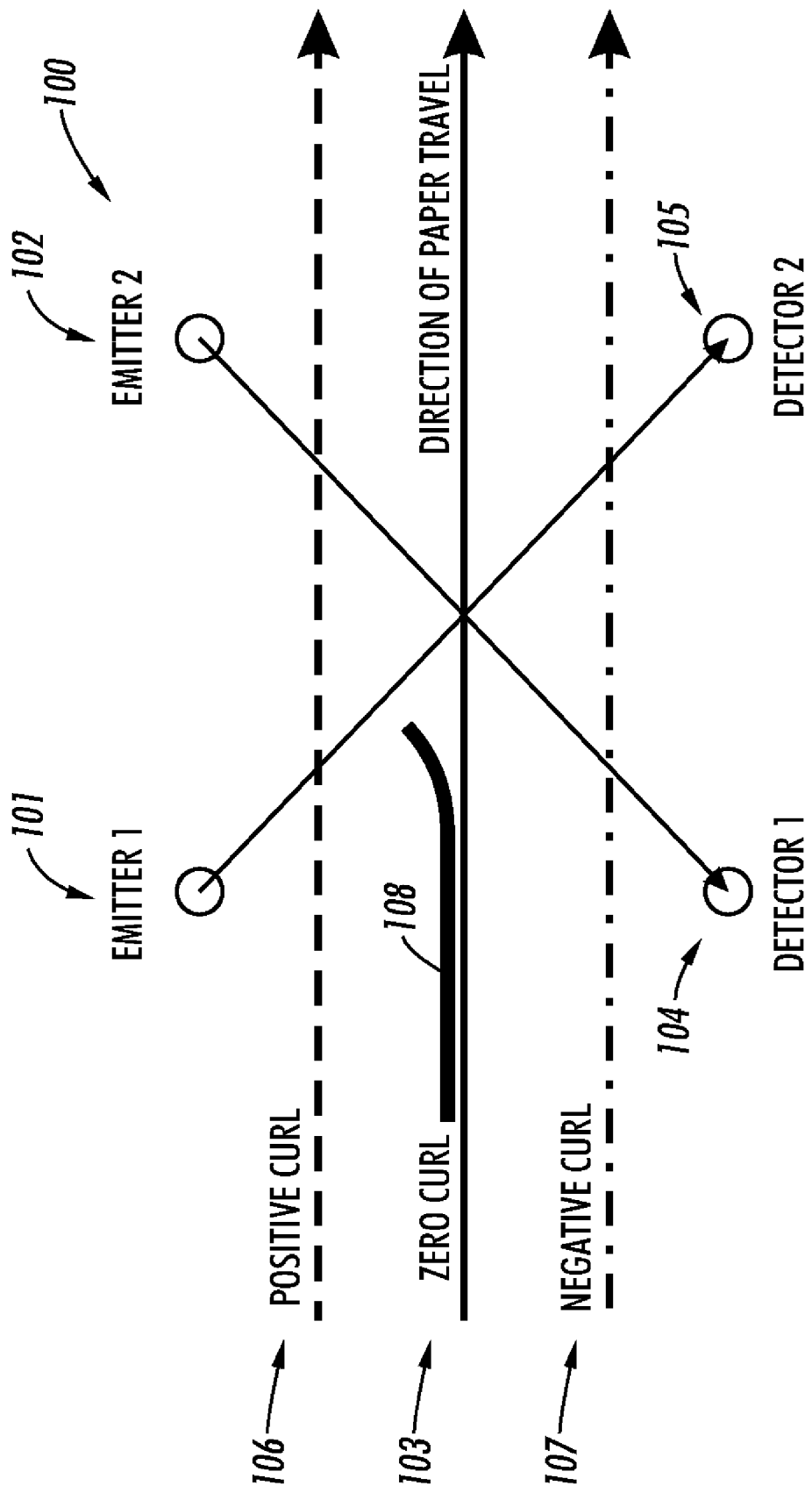
FIG. 1 illustrates a lead edge sheet curl sensor apparatus, which can be implemented in accordance with a preferred embodiment.

FIG. 1 illustrates a lead edge sheet curl sensor 100, which can be adapted for use in accordance with a preferred embodiment. In general, the Lead edge sheet curl sensor 100 can be implemented in the context of measuring the leading edge position of a transport media substrate in a marking engine, such as paper or transparencies in a xerographic printer. As indicated in FIG. 1, two light emitters 101 and 102 can be disposed above a transport media path 103. Located below the transport media path 103 are two light detectors 104 and 105. Light emitter 101 can be aligned such that a light beam emitted from light emitter 101 is directed toward light detector 105. Light emitter 102 can be aligned such that an emitted light beam is directed toward light detector 104.

Light emitters 101 and 102 can be mounted such that the light beams from light emitters 101, 102 cross the ideal transport media path 103 at approximately an angle of 45 degrees, although, other crossing angles are possible in accordance with other embodiments. Light emitters 101 and 102 can be mounted in the lead edge paper curl sensor 100 so that the light beams emitted from the light emitters 101 and 102 cross each other at close to the ideal transport media path 103 and at an angle of approximately 90 degrees to each other, although, other crossing angles are possible. Relative to the transport media path, light emitter 101 can be mounted before light emitter 102 such that the media substrate 108 transported on the transport media path 103 passes below light emitter 101 first and passes below light emitter 102 secondly. Both light emitters 101 and 102 are positioned such that the media substrate 108 can pass through both light emitter beams as it transverses the sensor 100.

A positive curl associated with the media substrate 108 is indicated in FIG. 1 by arrow 106. The "positive curl", as defined by FIG. 1, can constitute any curl of the leading edge of the media substrate in the positive direction towards arrow 106. "Negative curl" is defined similarly in the negative direction and shown as arrow 107 in FIG. 1. Media substrate 108 is shown in FIG. 1 with a slight positive curl for illustrative purposes only.

The lead edge sheet curl sensor 100 operates by measuring any time difference between an interruption of the light beams from light emitters 101 and 102 as detected at the detectors 104 and 105. Media substrate 108 traveling on the ideal transport path 103 with zero curl of the leading edge will pass through the intersection of the beams from light emitters 101 and 102, interrupting the light beams sensed at the detectors 104 and 105 simultaneously. Media substrate 108 with a positive curl of the leading edge towards light emitters 101 and 102 will interrupt the light beam from light emitter 101 as sensed at detector 105 before the light beam from light emitter 102 is sensed at detector 104. Similarly, media substrate 108 with a negative leading edge curl away from the emitters 101 and 102 will interrupt the light beam from light emitter 102 as sensed at detector 104 before the light beam from light emitter 101 is sensed at detector 105. The amount of time elapsed between the two interruptions of the light beams as sensed at detectors 104 and 105 is generally the measure of media substrate 108 leading edge curl. The direction of the media substrate curl, either positive or negative, is indicated by order of the interruption of the light beams as detected at light detectors 104 and 105.

The output signals from the detectors 104 and 105 can be processed utilizing a microprocessor such as that disclosed in U.S. Pat. No. 5,751,443 to Borton et al. The lead edge paper curl sensor 100 can utilize the known self calibration techniques of U.S. Pat. No. 5,751,443. The curl measurement resolution is a function of timer clock speed. Increased timer clock speeds will result in a higher curl measurement resolution and increased sensor sensitivity and precision. A preferred embodiment may possess a maximum sensing resolution of less than 0.01 mm. Of course, other resolution values are also possible. One parameter that must be known and controlled is the media transport velocity. The timing of the interruption of the light beams at detectors 104 and 105 is directly proportional to the transport media velocity as the media substrate 108 transverses the lead edge paper curl sensor.

Alternatively, if the length of the media substrate 108 is known, the media substrate velocity may be calculated utilizing the timing of the interruption of the light beam caused by the leading edge of the media substrate 108 and the resumption of light detection at either detector 104 or 105 after the trailing edge of the media substrate passes. It can be appreciated that the techniques and devices discussed in U.S. Pat. No. 5,751,443 are referenced herein for illustrative and edification purposes only and do not constitute limiting features of the disclosed embodiments. It can be appreciated that other types of calibration techniques can be adapted for use with alternative embodiments.

Figure 2:
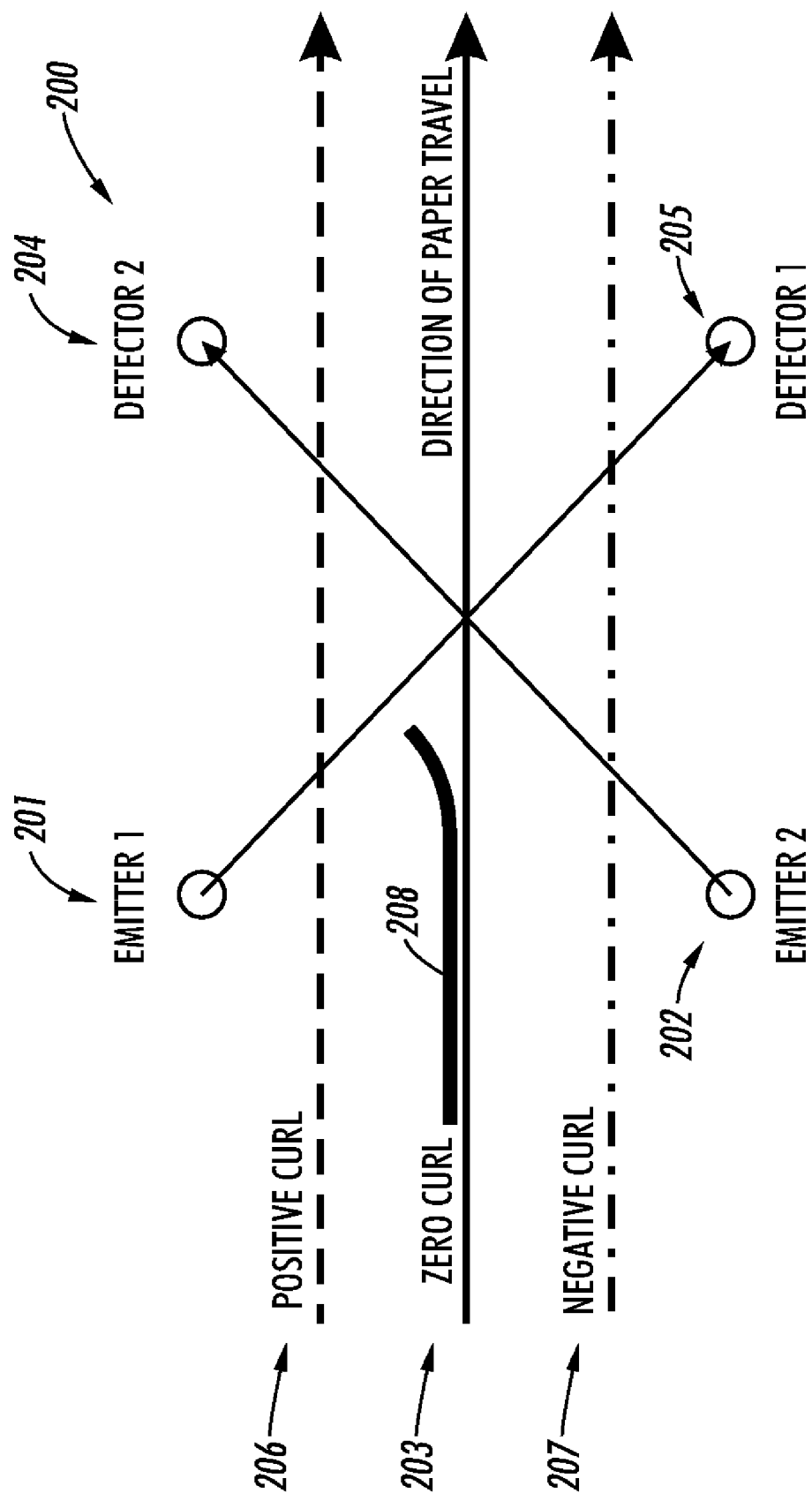
FIG. 2 illustrates a lead edge sheet curl sensor apparatus, which can be implemented in accordance with an alternative embodiment.

FIG. 2 illustrates an additional embodiment of a lead edge sheet curl sensor 200. As indicated in FIG. 2, lead edge sheet curl sensor 200 comprises two light emitters 201 and 202 disposed on opposite sides of the transport media path 203. Also disposed on opposite sides of the transport media path are two light detectors, 204 and 205. Light emitter 201 can be aligned such that a light beam emitted from light emitter 201 is directed toward light detector 205. Light emitter 202 can be aligned such that an emitted light beam is directed toward light detector 204.

Lead edge curl sensor 200 operates similarly to lead edge curl sensor 100. Light emitters 201 and 202 can be mounted such that the light beams from light emitters 201, 202 cross the ideal transport media path 203. As shown in FIG. 2, light emitters 201 and 202 are mounted in lead edge paper curl sensor 200 so that the light beams cross each other at close to the ideal transport media path 203 and at an angle of approximately 90 degrees to each other, although, other crossing angles are possible in accordance with other embodiments. Relative to the transport media path, light emitter 201 can be mounted above light emitter 202 such that the media substrate 208 transported on the transport media path 203 passes between light emitters 201 and 202. Both light emitters 201 and 202 are positioned such that the media substrate 208 can pass through both light emitter beams as it transverses the sensor 200.

A positive curl associated with the media substrate 208 is indicated in FIG. 2 by arrow 206. The "positive curl", as defined by FIG. 2, can constitute any curl of the leading edge of the media substrate in the positive direction towards arrow 206. "Negative curl" is defined similarly in the negative direction and shown as arrow 207 in FIG. 2. Media substrate 208 is shown in FIG. 2 with a slight positive curl for illustrative purposes only. The lead edge sheet curl sensor 200 operates by measuring any time difference between an interruption of the light beams from light emitters 201 and 202 as detected at the detectors 204 and 205, just as in lead edge curl sensor 100. The output signals from the detectors 204 and 205 can be processed in a microprocessor such as that disclosed in U.S. Pat. No. 5,751,443 to Borton et al. The lead edge paper curl sensor 200 can utilize the known self calibration techniques of U.S. Pat. No. 5,751,443. It can be appreciated that the techniques and devices discussed in U.S. Pat. No. 5,751,443 are referenced herein for illustrative and edification purposes only and do not constitute limiting features of the disclosed embodiments. It can be appreciated that other types of calibration techniques can be adapted for use with alternative embodiments.

Figure 3:
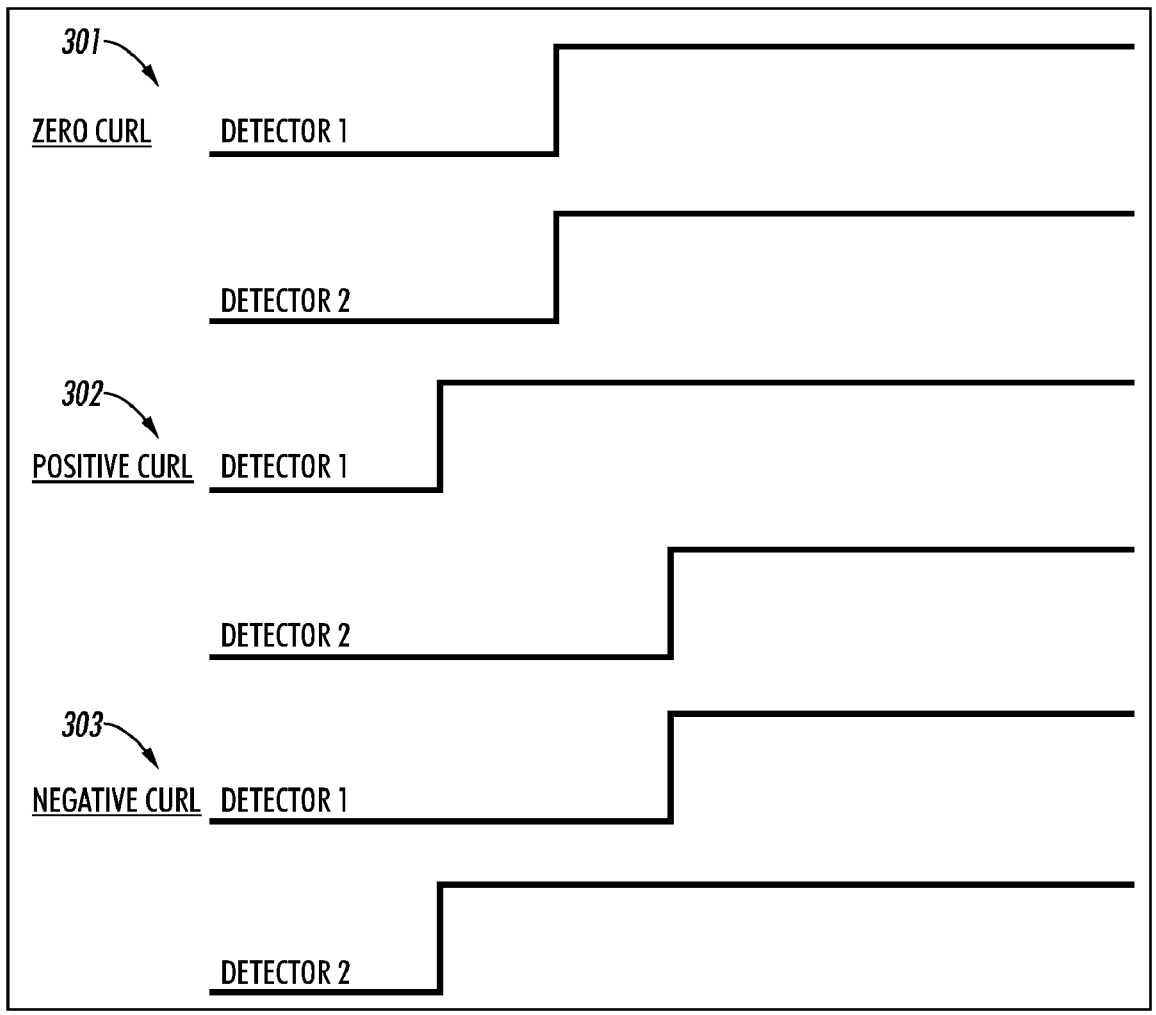
FIG. 3 illustrates a graph of the light beams received by the detectors of the sensor of FIG. 1 verses time, in accordance with an embodiment.

FIG. 3 illustrates a schematic diagram of representative output signals emitted from light detectors 104 and 105 over a particular period of time as the media substrate 108 travels at a velocity of 1 meter per second through the lead edge curl sensor 100, in accordance with a preferred embodiment. Plot 301 of FIG. 3 shows an example of the output signals from detectors 104 and 105 in a condition of zero curl of the media substrate 108. The zero curl condition causes the media substrate 108 to interrupt the light beams from light emitters 101 and 102 simultaneously, resulting in a detector timer difference of zero time. Plot 302 of FIG. 3 illustrates an example of the output signal from detectors 104 and 105 in a condition of positive curl of the media substrate 108. The positive curl condition causes the media substrate 108 to interrupt the light beams from light emitter 101 first and light emitter 102 second, resulting in a measurable time difference in the light detector output signals. Similarly, plot 303 of FIG. 3 depicts the negative curl condition, wherein the downward leading edge curl of the media substrate 108 causes the light beam of emitter 102 to be interrupted first followed by interruption of the light beam of light emitter 101. A schematic diagram of representative output signals from light detectors 204 and 205 in lead edge curl sensor 200 would be similar to those in FIG. 3.

Figure 4:
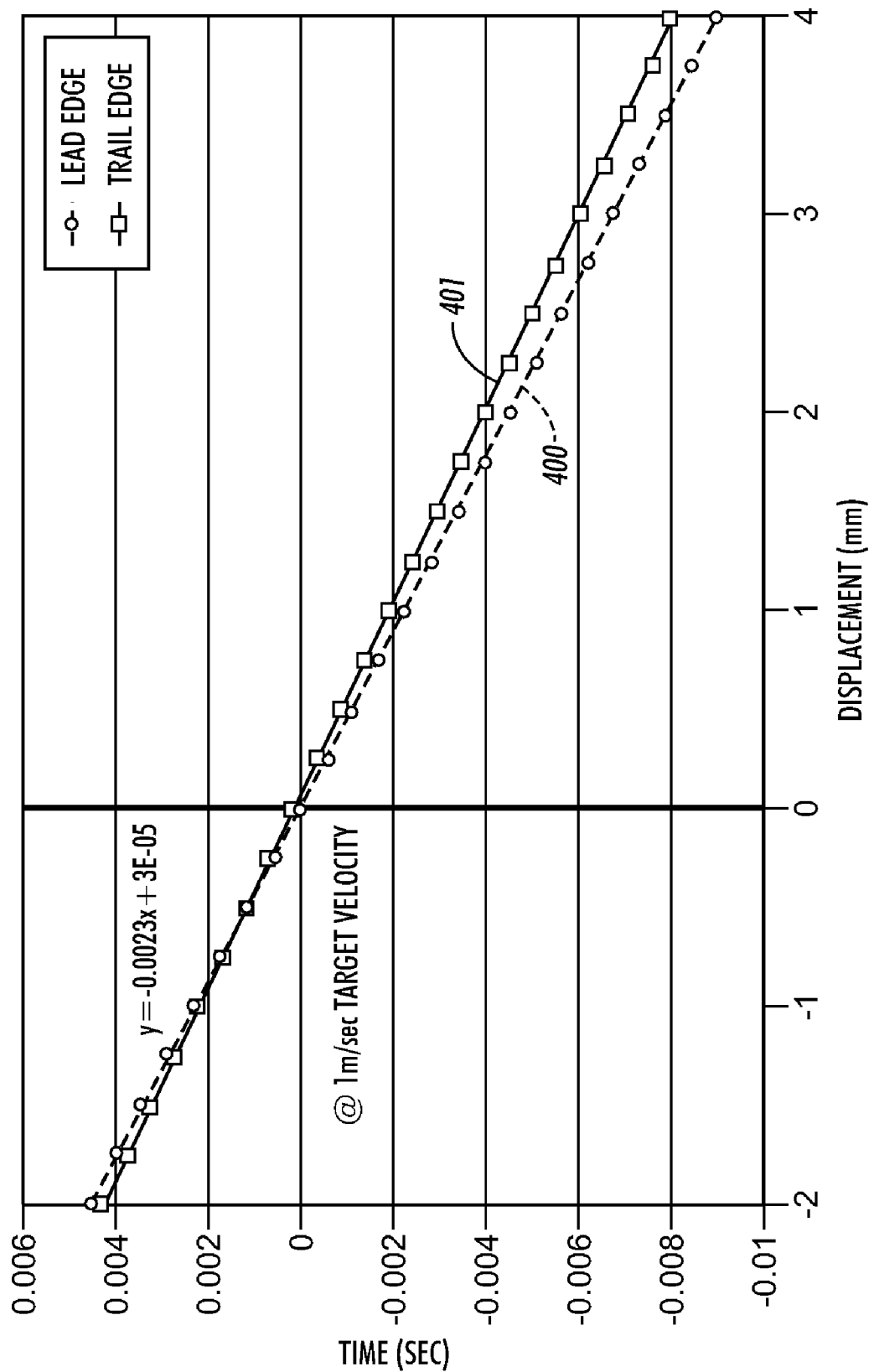
FIG. 4 illustrates a plot of time verses displacement of the lead edge and trail edge of paper in the sensor disclosed, in accordance with an embodiment.

FIG. 4 illustrates an example of test data provided by a lead edge curl sensor 100 wherein the light emitter beams cross the media transport media path 103 at approximately an angle of 45 degrees, in accordance with a preferred embodiment. In FIG. 4, plot 400 indicates the linear function of the measurement of the time differences between the light beams interrupted by the media substrate 108 and the linear displacement of the leading edge of the substrate. Plot 401 indicates the measurement of time differences between the light beams interrupted by the media substrate 108 and the displacement of the media substrate trailing edge.

The alignment of the light beams from light emitters 101 and 102 wherein the beams cross exactly at the ideal media transport path 103 would be the condition requiring no further calibration. However, the slight misalignment of the light emitters may be calibrated out by using a reference delay time between the signals, achieving the maximum media substrate curl resolution even with slightly misaligned light emitter beams. Additionally, reduction of stray light and shaping of the beams can improve signal to noise ratio at the light detectors 104 and 105 by increasing the "on" to "off" detector contrast.

Figure 5:
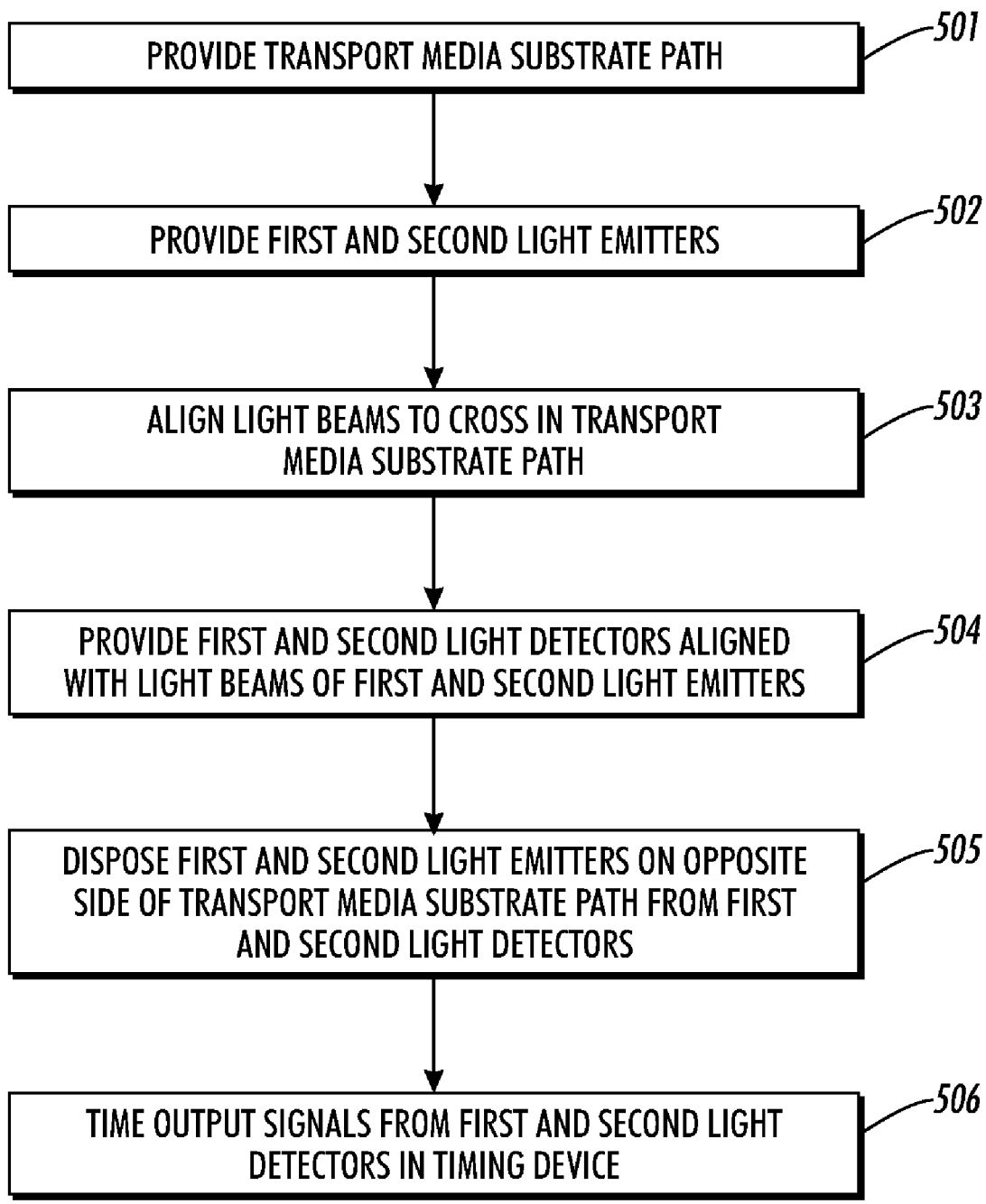
FIG. 5 illustrates a flow chart depicting a method of sensing the lead edge sheet curl, which can be implemented in accordance with a preferred embodiment.

FIG. 5 illustrates a flow chart of operations depicting logical operational steps of lead edge sheet curl sensing method 500, which can be implemented in accordance with a preferred embodiment. First, a transport media sheet substrate path can be provided, as depicted at block 501. Next, first and second light emitters are provided, as illustrated at block 502. Block 503 depicts an operation for of aligning the light beams of the first and second light emitters so that the light beams cross at the transport media sheet path. Thereafter as described at block 504, first and second light detectors can be aligned with the first and second light emitters. The first and second light emitters are generally disposed on opposite respective sides of the transport media sheet substrate path from the first and second light detectors, as depicted next at block 505. The final step includes timing the output signals from the first and second light detectors in a timing device (e.g., a microcontroller, microprocessor or other timing device) such that the time differential of the output signals is proportional to the lead edge sheet positive or negative curl, as depicted at block 506.

Figure 6:
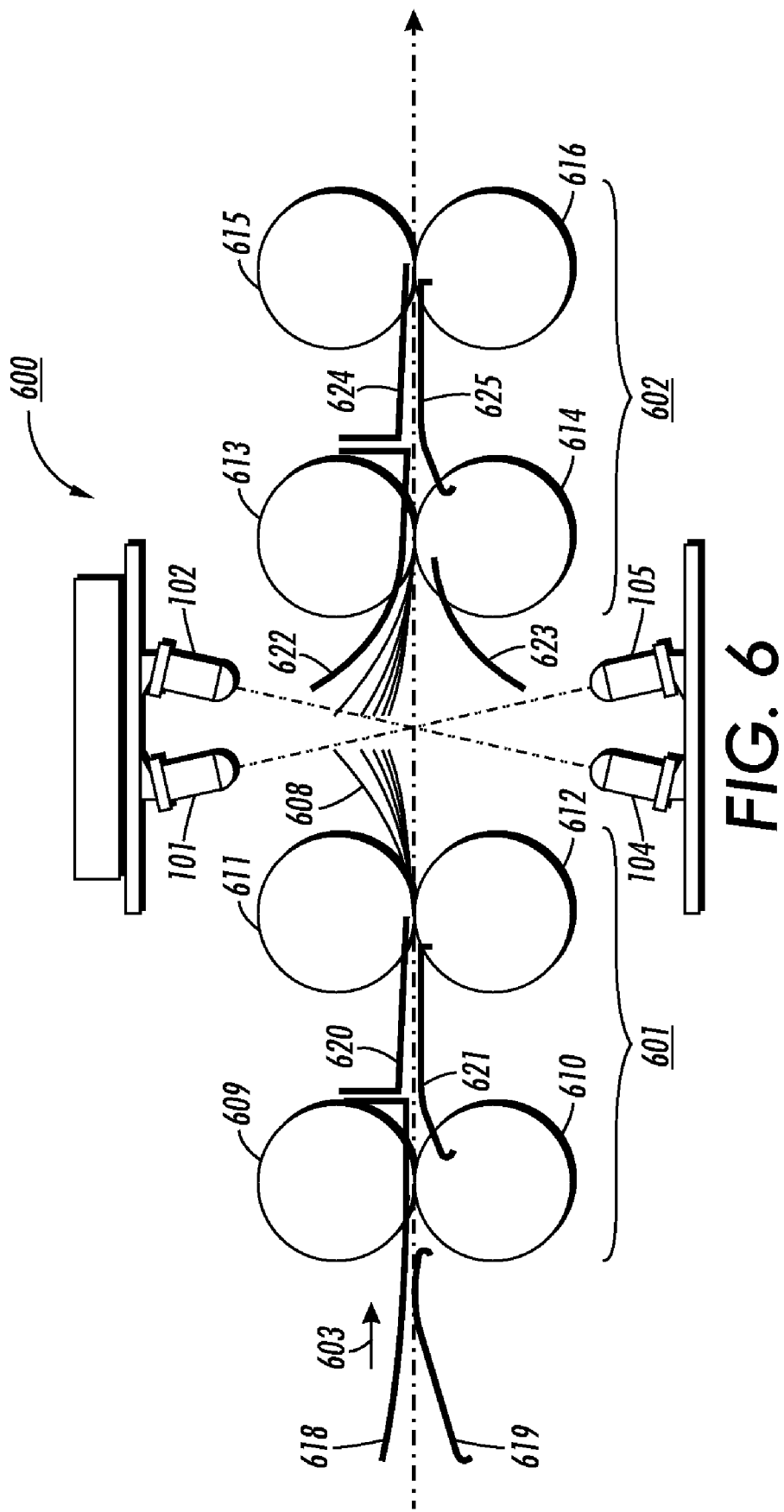
FIG. 6 illustrates a schematic diagram of a lead edge and trail edge sheet curl sensor system equipped with constraint rollers, in accordance with a preferred embodiment.

FIG. 6 illustrates a high-level schematic diagram depicting an edge restraint system 600, which can be implemented in accordance with a preferred embodiment. System 600 can include the use of the lead edge curl sensor 100 depicted in FIG. 1. Note that in FIGS. 1-9, identical or similar parts are generally indicated by identical reference numerals. Although the lead edge curl sensor 100 of FIG. 1 is also depicted in FIG. 6, for purposes of illustration, it can be appreciated that an alternative embodiment can be implemented, which utilizes the lead edge curl sensor 200 of FIG. 2. The edge constraint system 600 comprises both a lead edge constraint system 601 and a trailing edge constraint system 602. The lead edge constraint system 601 constrains the edge of the substrate media 608 such that the curt sensor 100 is able to accurately measure the sheet media curl. The process direction of the substrate media is indicated by arrow 603 in FIG. 6.

The lead edge constraint system 601 maintains the media substrate sheet 608 as it proceeds along the substrate sheet media path 603 to the lead edge curl sensor 100. The constraint of the substrate media 608 can be achieved through the functionality of drive rollers 609 and 610, which can be positioned on opposite sides of the substrate media path 603 and drive the substrate 608 towards the lead edge curl sensor 100. In addition, there are two constraint rollers 611 and 612 further positioned between the drive rollers and the lead edge curl sensor 100. The substrate 608 travels between the constraint rollers 611 and 612. In one embodiment of lead edge constraint system, the drive rollers 609 and 610 can be positioned close to the constraint rollers 611 and 612 at an exemplary distance of less than 100 mm. It can be appreciated, of course, that the parameter of 100 mm is merely a suggested value and is not considered a limiting feature of the disclosed embodiments.

The constraint rollers 611 and 612 are composed of a non-deformable material which provides a light clamping force to the substrate 608 while not damaging the substrate 608. One example of a non-deformable material for the composition of the constraint rollers 611 and 612 would be a hard non-deformable plastic, although the composition of the constraint rollers 611 and 612 could be composed of any non-deformable material capable of providing a light clamping force to the substrate media 608. The non-deformable constraint rollers 611 and 612 ensure that the substrate media 608 is held tangent to the constraint rollers 611 and 612 on the substrate media path 603. The drive speed of the constraint rollers 611 and 612 is controlled such that the lead edge constraint rollers 611 and 612 are driven at a slightly higher speed than that of the drive rollers 609 and 610 to keep the substrate media 608 taunt and under tension as it enters the curl sensor 100.

Alternatively, in an additional embodiment, drive rollers 611 and 612 can be composed of a deformable material such that each roller 611 and 612 has similar elastic modulus or stiffness. The nip thus formed by rollers 611 and 612 provides a consistent sheet ejection angle over a wide range of substrates and nip normal forces.

The trailing edge constraint system 602 functions in a manner that is similar to the lead edge constraint system 601. The trailing edge constraint system 602 holds the substrate media 608 as it exits the curl sensor 100 such that the trailing edge curl of the substrate media 608 can be accurately measured. The trailing edge constraint system includes the drive rollers 615 and 616 positioned on opposite sides of the substrate media path 603 wherein the substrate media 603 is pulled forward after exiting the curl sensor 100. Between the curl sensor 100 and the drive rollers 615 and 616 are positioned the trailing edge constraint rollers 613 and 614. The trailing edge constraint rollers 613 and 614 could be composed of any non-deformable material capable of providing a light clamping force to the substrate media 608, or of a deformable material such that each roller 613 and 614 has similar elastic modulus or stiffness, as in the lead edge constraint rollers 611 and 612.

The drive speed of the trailing edge constraint rollers 613 and 614 is controlled such that the constraint rollers 613 and 614 are driven at a slightly slower speed than that of the drive rollers 615 and 616 to keep the substrate media 608 taunt and under tension as it exits the curl sensor 100. This allows the curl sensor 100 to make an accurate measurement of the amount of curl of the trailing edge of the substrate media 608. As in the lead edge constraint rollers, the trailing edge constraint rollers 613 and 614 are positioned closely to the trailing edge drive rollers 615 and 616. One embodiment has the distance between the trailing edge rollers at a distance of less than 110 mm in order to keep the substrate media tangent to the constraint rollers 613 and 614.

All four constraint rollers 611, 612, 613, 614 for both the leading and trailing edges can be formed such that the rollers 611, 612, 613, 614 span the full width of the substrate media (i.e., in the cross process direction). This full width span of the constraint rollers 611, 612, 613, 614 prevents the substrate media from buckling or corrugating in the cross-process direction, which can affect the accuracy of the curl sensor measurement. Also illustrated in FIG. 6 are lead-in baffles 618, 619, 620, 621, 622, 623, 624, and 625. The lead-in baffles minimize the possibility of the substrate media 608 stubbing along the substrate sheet media path 603.

Figure 7:
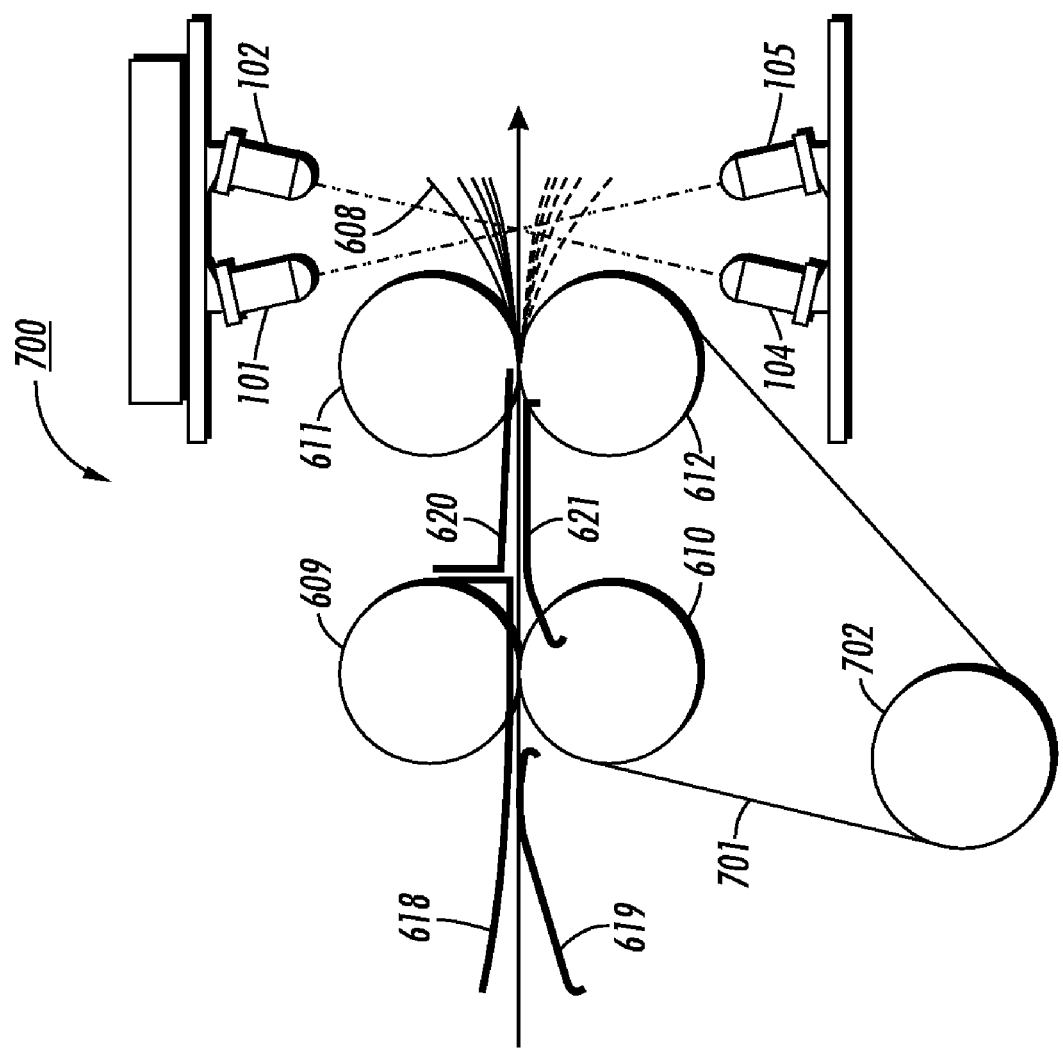
FIG. 7 illustrates a schematic diagram of a lead edge sheet curl sensor with the lead edge constraint, drive and belt drive rollers illustrated.

FIG. 7 illustrates a high-level schematic diagram depicting only the lead edge portion 601 of the edge curl constraint system 600 of FIG. 6, which can be implemented in accordance with a preferred embodiment. The configuration depicted in FIG. 7 is similar to that illustrated in FIG. 6 with the addition of drive belt 701 and drive motor 702. The configuration of the trailing edge constraint rollers is not depicted, but is similar to the lead edge drive system. Motor 702 drives the drive belt 701 which in turn drives the rollers 610 and 612. As noted above, the lead edge constraint roller 612 is driven by the drive belt 701 at a rotational speed slightly higher than that of the drive roller 610. It should be further noted that FIG. 7 illustrates only the drive system for the lower set of rollers 610 and 612. A similar drive system would be utilized for the rollers 609, 611, 613, 614, 615 and 616.

Figure 8:
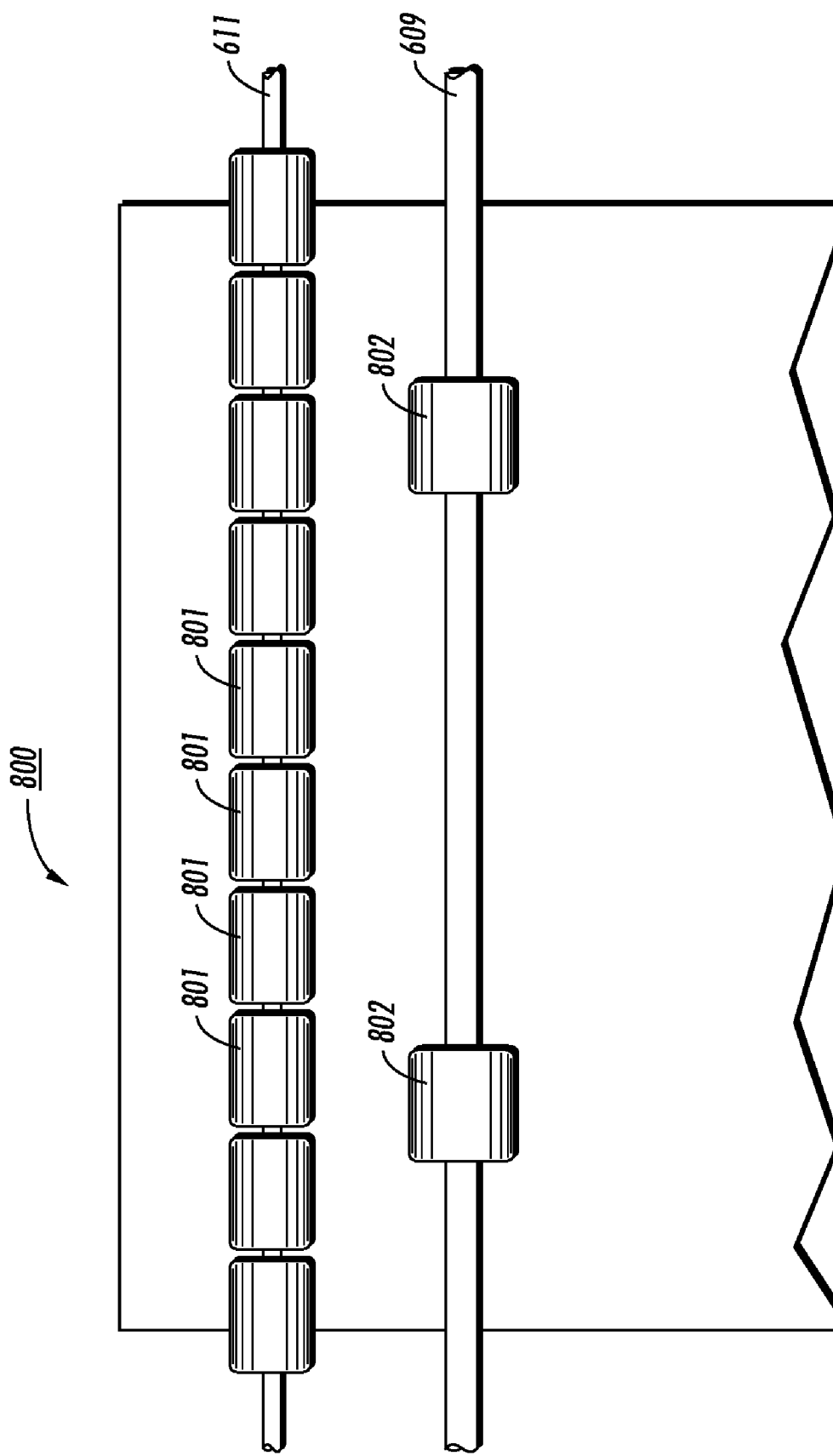
FIG. 8 illustrates a vertical perspective of the lead edge constraint and drive roller.

FIG. 8 illustrates a vertical perspective of drive roller 609 and constraint roller 611. The full width span of the constraint roller 611 is shown as a plurality of constraint nips 801 on the constraint roller 611. The important point of the full width span of the constraint rollers 611 is that the media substrate sheet is prevented from buckling or corrugating in the cross-process direction by the full span width of the constraint nips 801. The drive roller 609 comprises two drive nips 802, as depicted in this example. The drive nips 802 are not required to span the full width, only remain in contact with the media sheet substrate 608 in order to drive the media sheet substrate forward towards the lead edge curl sensor system 100.

Figure 9:
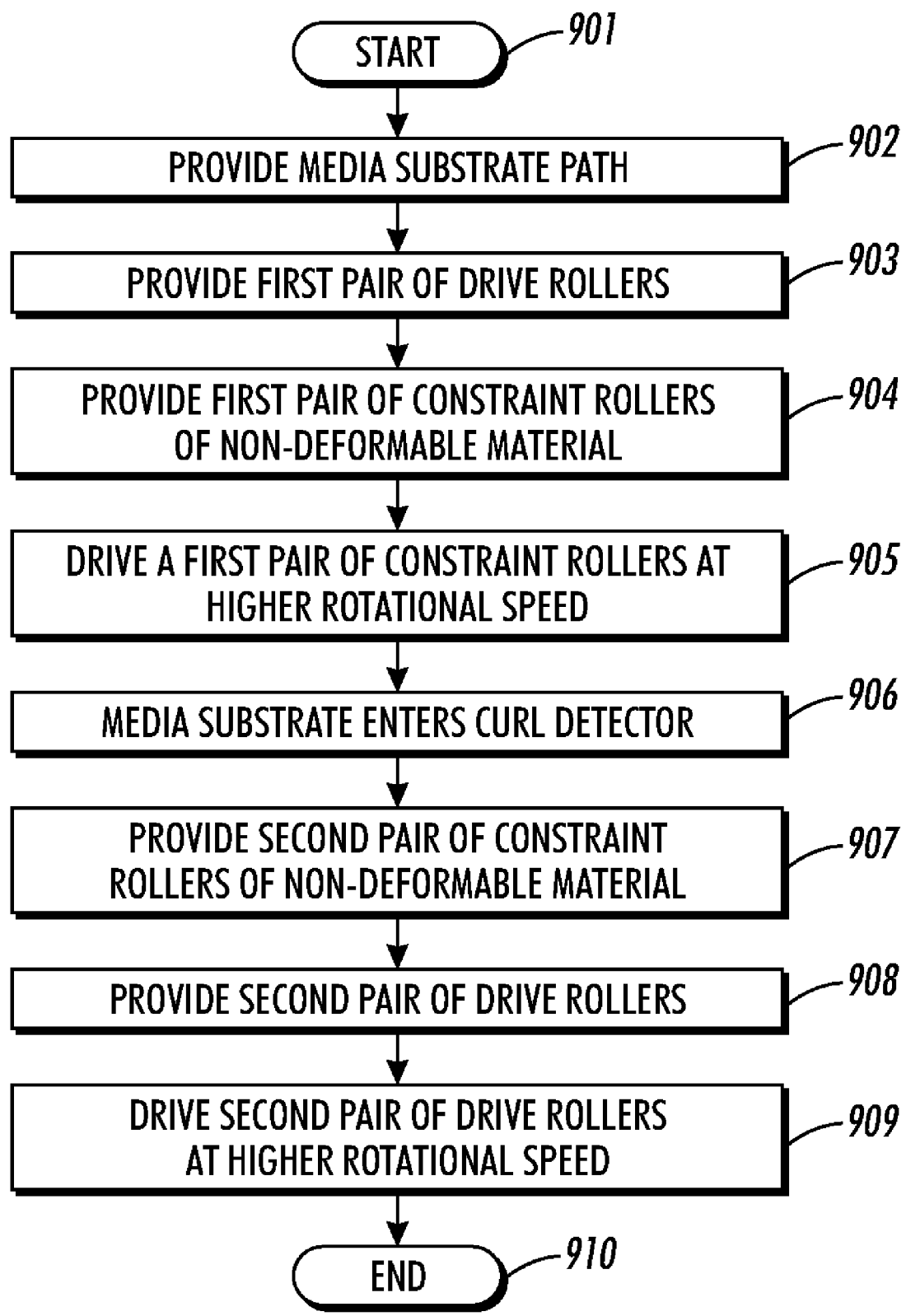
FIG. 9 illustrates a high level flow chart of operations depicting logical operational steps of an edge constraint method, which can be implemented in accordance with a preferred embodiment.

FIG. 9 illustrates a flow chart of operations depicting logical operational steps of an edge sheet substrate constraint method 900 that can be implemented in accordance with an alternative embodiment. The process beings as indicated at block 901. First, a media sheet substrate path can be provided, as illustrated at block 902. Next, as described at block 903, a first pair of drive rollers can be provided to transport the media substrate. Next, as depicted at block 904, a first pair of constraint rollers formed of a non-deformable material, can be provided to constrain the media substrate. Thereafter as illustrated at block 905, the constraint rollers can be driven at a higher rotational speed than the drive rollers. Next, as described at block 906, the media substrate then enters a substrate curl detector. Upon exiting the substrate curl detector, the media substrate can be further constrained as indicated at block 907 by providing a second pair of constraint rollers formed of a non-deformable material. The media substrate is then driven forward by providing a second pair of drive rollers, as illustrated at block 908. The second pair of drive rollers can then be driven at a high rotational speed than the second pair of constraint rollers, as described at block 909. The method 900 can then terminate, as depicted at block 910.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. An apparatus, comprising:
   a media substrate curl sensor, wherein said curl sensor is configured to measure an amount of curl of a media substrate;
   a first pair of substrate constraint rollers, which constrains said media substrate at a pre-defined angular trajectory and wherein each roller of said first pair of substrate constraint rollers is disposed on opposite sides of a transport media substrate path; and
   a first pair of substrate drive rollers, wherein each roller of said first pair of substrate drive rollers is disposed on opposite sides of said transport media substrate path, wherein said first pair of substrate constraint rollers and said first pair of substrate drive rollers maintain said media substrate under tension wherein said first pair of substrate constraint rollers provides a higher drive speed of said media substrate than said first pair of substrate drive rollers and wherein said media substrate passes in succession through said first pair of substrate drive rollers, said first pair of substrate constraint rollers and said media substrate curl sensor, thereby providing for a media substrate constraint and curl sensor apparatus.

2. The apparatus of claim 1 further comprising:
   a second pair of substrate constraint rollers, wherein each roller of said second pair of substrate constraint rollers is disposed on opposite sides of said transport media substrate path; and
   a second pair of substrate drive rollers, wherein each roller of said second pair of substrate drive rollers is disposed on opposite sides of said transport media substrate path wherein said second pair of substrate constraint rollers and said second pair of substrate drive rollers maintain said media substrate under tension and wherein said media substrate passes in succession through said media substrate curl sensor, said second pair of substrate constraint rollers and said second pair of substrate drive rollers.

3. The apparatus of claim 2, wherein said second pair of substrate drive rollers provides a higher drive speed of said media substrate than said second pair of substrate constraint rollers.

4. The apparatus of claim 2 wherein said first pair of substrate constraint rollers provides a higher drive speed of said media substrate than said first pair of substrate drive rollers and said second pair of substrate drive rollers provides a higher drive speed of said media substrate than said second pair of substrate constraint rollers.

5. The apparatus of claim 1, wherein said first pair of substrate constraint rollers comprise nips which span a full width of said media sheet substrate.

6. The apparatus of claim 1, wherein said each roller of said first pair of substrate constraint rollers are composed of a material with an equal elasticity.

7. The apparatus of claim 6, wherein said material with an equal elasticity is a non-deformable material.

8. An apparatus, comprising:
   a media substrate curl sensor wherein, said curl sensor is adapted to measure an amount of curl of a media substrate;
   a first pair and a second pair of substrate constraint rollers, wherein each roller of said first and said second pair of substrate constraint rollers is disposed on opposite sides of a transport media substrate path, whereby said media substrate is constrained by said first and said second pair of substrate constraint rollers and said first pair of constraint rollers constrains said media substrate at a pre-defined angular trajectory; and
   a first pair and a second pair of substrate drive rollers wherein each roller of said first and said second pair of substrate drive rollers is disposed on opposite sides of said transport media substrate path, wherein said first pair of substrate constraint rollers and said first pair of substrate drive rollers maintain said media substrate under tension wherein said second pair of substrate drive rollers provides a higher drive speed than said second pair of substrate constraint rollers and wherein said second pair of substrate constraint rollers and said second pair of substrate drive rollers maintain said media substrate under tension and wherein said first pair of substrate drive rollers and substrate constraint rollers are disposed on opposite sides of said curl sensor from said second pair of drive and constraint rollers; thereby providing for a media substrate constraint and curl sensor apparatus.

9. The apparatus of claim 8, wherein said media substrate curl sensor measures said amount of curl of a leading edge of said media substrate.

10. The apparatus of claim 9, wherein said media substrate curl sensor measures said amount of curl of a trailing edge of said media substrate.

11. The apparatus of claim 10, wherein said media substrate passes in succession through said first pair of substrate constraint rollers, said media substrate curl sensor and said second pair of substrate constraint rollers.

12. The apparatus of claim 11, wherein said media substrate is transported through said media substrate curl sensor by said first and said second pair of substrate drive rollers.

13. The apparatus of claim 12, wherein said each roller of said first and said second pair of substrate constraint rollers are composed of a material with an equal elasticity.

14. The apparatus of claim 13, wherein said first pair of substrate constraint rollers provides a higher drive speed of said media substrate than said first pair of substrate drive rollers.

15. The apparatus of claim 13, wherein said material with an equal elasticity is a non-deformable material and wherein both said first and said second pairs of substrate constraint rollers comprise nips which span a full width of said media sheet substrate.

16. A method, comprising:

transporting a media substrate in succession through a first pair of substrate drive rollers and then a first pair of substrate constraint rollers before entering a media curl sensor;

driving said first pair of substrate constraint rollers to provide a higher drive speed of said media substrate than said first pair of substrate drive rollers;

measuring a curl of both a leading edge and a trailing edge of said media substrate by said media substrate curl sensor; and transporting said media substrate in succession through a second pair of substrate constraint rollers and then a second pair of substrate drive rollers after exiting said media curl sensor wherein said first pair of substrate constraint rollers and said first pair of substrate drive rollers maintain said media substrate under tension, thereby providing for a media substrate constraining and curl sensing method.

17. The method of claim 16 further comprising:

forming said first and said second pair of constraint rollers of a material of an equal elasticity; and driving said second pair of substrate drive rollers to provide a higher drive speed of said media substrate than said second pair of substrate constraint rollers.

18. The method of claim 17 wherein said material of an equal elasticity is composed of a non-deformable material.

* * * * *